(12) United States Patent  
Wu

(10) Patent No.: US 11,608,922 B2
(45) Date of Patent: Mar. 21, 2023

(54) VALVE CONNECTOR SWITCHABLE BETWEEN LOCKING AND RELEASING

(71) Applicant: Scott Wu, Taichung (TW)

(72) Inventor: Scott Wu, Taichung (TW)

( * ) Notice: Subject to any disclaimer, the term of this patent is extended or adjusted under 35 U.S.C. 154(b) by 173 days.

(21) Appl. No.: 17/151,271

(22) Filed: Jan. 18, 2021

(65) Prior Publication Data

US 2021/0388927 A1 Dec. 16, 2021

(30) Foreign Application Priority Data

Jun. 11, 2020 (TW) .................................. 109119635

(51) Int. Cl.
*F16L 37/47* (2006.01)
*B60S 5/04* (2006.01)
(Continued)

(52) U.S. Cl.
CPC ................ *F16L 37/47* (2013.01); *B60S 5/04* (2013.01); *F16L 37/20* (2013.01); *F16L 37/40* (2013.01);
(Continued)

(58) Field of Classification Search
CPC ..... F16K 1/16; F16K 5/00; F16K 5/02; F16K 5/0207; F16K 5/0214; F16K 5/04; F16K 5/0414; F16K 5/06; F16K 5/061; F16K 5/161; F16K 5/181; F16K 15/20; F16K 31/58; F16L 32/20; F16L 32/40; F16L 32/084; F16L 32/14; F16L 32/18; F16L 32/38; F16L 32/44; F16L 32/47; Y10T 137/3724; Y10T 137/87965;
(Continued)

(56) References Cited

U.S. PATENT DOCUMENTS 610,976 A * 9/1898 Schionning et al. ... F16K 15/20
251/352
711,983 A * 10/1902 Leidecker ................. F16K 1/16
251/303
(Continued)

FOREIGN PATENT DOCUMENTS

CN 201973306 U 9/2011
CN 103291981 B 9/2017
(Continued)

*Primary Examiner* — Kevin F Murphy
*Assistant Examiner* — Jonathan J Waddy
(74) *Attorney, Agent, or Firm* — Karin L. Williams; Alan D. Kamrath; Mayer & Williams PC

(57) ABSTRACT

A valve connector includes a housing and a pressing device. The housing includes an operative end, a coupling end, and a through-hole extending from the operative end through the coupling end. The pressing device includes a push seat received in the through-hole and located between the lever and the coupling end and a lever abutting against the push seat and pivotably connected to the housing. The push seat includes a first passageway. The lever includes a second passageway and is operable to move the push seat. When the lever is in a release position, the first passageway does not intercommunicate with the second passageway. When the lever moves from the release position to a locking position, the push seat moves towards the coupling end, and the first passageway intercommunicates with the second passageway when the lever is in the locking position.

11 Claims, 8 Drawing Sheets

(51) Int. Cl.
*F16L 37/40* (2006.01)
*F16L 37/20* (2006.01)

(52) U.S. Cl.
CPC .. *Y10T 137/3724* (2015.04); *Y10T 137/88102* (2015.04)

(58) Field of Classification Search
CPC ....... Y10T 137/87973; Y10T 137/8807; Y10T 137/88078; Y10T 137/88102; B60C 23/00; B60S 5/04; F04B 33/00; F04B 33/005
USPC ............ 251/149.9; 137/614.06, 231, 614.05, 137/615, 616, 617
See application file for complete search history.

(56) References Cited

U.S. PATENT DOCUMENTS

| | | | | |
|---|---|---|---|---|
| 950,263 A * | 2/1910 | Harpster | ................. | F16L 37/32 251/117 |
| 1,385,080 A * | 7/1921 | Key | ........................ | F16L 37/40 285/8 |
| 3,700,211 A * | 10/1972 | Manoogian | ............. | F16K 5/061 251/315.1 |
| 4,347,870 A * | 9/1982 | Maldavs | ................. | F16L 37/23 251/149.6 |
| 4,905,965 A * | 3/1990 | Dolev | ..................... | F16L 37/22 285/91 |
| 5,050,841 A * | 9/1991 | Jacobsson | ............... | F16L 37/47 251/149.9 |
| 6,035,894 A * | 3/2000 | Weh | .................... | F16L 37/1215 137/614.05 |
| 10,369,551 B2 | 8/2019 | Paul et al. | | |
| 10,369,851 B2 | 8/2019 | Wu | | |
| 2004/0134544 A1* | 7/2004 | Mikiya | ................... | F16K 5/061 137/616.7 |
| 2013/0062879 A1 | 3/2013 | Wang | | |
| 2015/0202424 A1* | 7/2015 | Harton | ............. | A61M 39/1055 604/248 |

FOREIGN PATENT DOCUMENTS

| | | |
|---|---|---|
| CN | 208967131 U | 6/2019 |
| TW | 437852 U | 5/2001 |

* cited by examiner

VALVE CONNECTOR SWITCHABLE BETWEEN LOCKING AND RELEASING

BACKGROUND OF THE INVENTION

The present invention relates to a valve connector and, more particularly, to a valve connector switchable between locking and releasing.

U.S. Pat. No. 10,369,551 B2 discloses a pump head of an air pump including a head and a retaining device. The head includes an outer body having a compartment extending along a longitudinal axis thereof. The outer body include a first end and a second end. The retaining device is received in the compartment of the outer tube. The retaining device includes a seat adjacent to the first end of the outer body and an air seal ring adjacent to the second end of the outer body. The seat directly abuts the air seal ring and includes a cavity extending from an end thereof adjacent to the second end of the outer body towards another end thereof adjacent to the first end of the outer body. The seat further includes a first slot extending radially. A first retaining arm is disposed in the first slot.

Valve connectors generally includes two types: one with a locking function, and the other without the locking function. Valve connectors without the locking function provide an airtight effect by a rubber ring for tightly holding a valve. Valve connectors with the locking function are similar to the above pump head which tightly holds a valve by pivoting a lever. However, the above pump head requires connection with the valve and disposition of the lever, but the outer head can only be limited to a T-shaped structure.

In view of the above drawbacks, a need exists for a novel valve connector switchable between locking and releasing.

BRIEF SUMMARY OF THE INVENTION

An objective of the present invention is to provide a valve connector comprising a housing and a pressing device. The housing includes an operative end and a coupling end opposite to the operative end along a longitudinal axis of the housing. The housing includes a through-hole extending from the operative end through the coupling end along the longitudinal axis. The pressing device includes a push seat and a lever. The push seat is received in the through-hole and is located between the lever and the coupling end. The push seat includes a first passageway extending therethrough. The lever is pivotably connected to the housing and is pivotable between a release position and a locking position. The lever is adjacent to the operative end. The lever abuts against the push seat and is operable to move the push seat along the longitudinal axis. The lever includes a second passageway. When the lever is in the release position, the first passageway does not intercommunicate with the second passageway, and the push seat is adjacent to the operative end. When the lever moves from the release position to the locking position, the push seat moves towards the coupling end, and the first passageway intercommunicates with the second passageway when the lever is in the locking position.

In an example, the housing includes a sleeve and a connector. The sleeve includes the coupling end. The connector is connected to the sleeve and includes the operative end. The through-hole extends through the sleeve and the connector. The lever is pivotably connected to the connector.

In an example, an inner periphery of the connector surrounding the through-hole includes a first coupling groove and a second coupling groove. Each of the first and second coupling grooves extends from an end of the connector adjacent to the sleeve towards but spaced from the operative end. The first coupling groove and the second coupling groove are located on two opposite sides of the through-hole, respectively. A first protrusion and a second protrusion are located on two opposite sides of the lever, respectively. The first protrusion is received in the first coupling groove. The second protrusion is received in the second coupling groove.

In another example, an inner periphery of the connector surrounding the through-hole includes a first insertion groove and a second insertion groove on two opposite sides of the through-hole, respectively. Each of the first insertion groove and the second insertion groove extends radially from an outer periphery of the connector to the through-hole. The lever includes a third insertion groove extending therethrough in a direction perpendicular to the longitudinal axis. The third insertion groove does not intercommunicate with the second passageway. A pin extends through the first, second, and third insertion grooves. The lever is pivotable between the release position and the locking position about a pivotal axis defined by the pin.

In an example, the connector is in threading connection with the sleeve.

In an example, the pressing device includes an airtight ring disposed in the through-hole and adjacent to the coupling end. The airtight ring abuts against an end of the push seat opposite to the lever. When the lever is in the locking position, the push seat compresses and deforms the airtight ring. When the lever is in the release position, the airtight ring stores its original shape and push the push seat towards the operative end.

In an example, the first passageway includes a wider section and a narrower section. The wider section is in an end of the push seat adjacent to the lever. The narrower section is connected to an end of the wider section opposite to the lever. An anti-leak ring is disposed in the wider section. An end of the anti-leak ring abuts against an end face of the wider section adjacent to the narrower section. Another end of the anti-leak ring extends beyond the wider section and abuts against the lever. When the lever is in the locking position, the anti-leak ring abuts against an outer periphery of the lever.

In an example, an end of the lever opposite to the push seat includes a coupling portion. The lever includes a locking portion between two ends thereof. The coupling portion has a width smaller than a width of the locking portion. The lever is connected to a jacket in threading connection with the locking portion. The jacket surrounds but is spaced from the coupling portion.

The present invention will become clearer in light of the following detailed description of illustrative embodiments of this invention described in connection with the drawings.

DETAILED DESCRIPTION OF THE INVENTION

Figure 1:
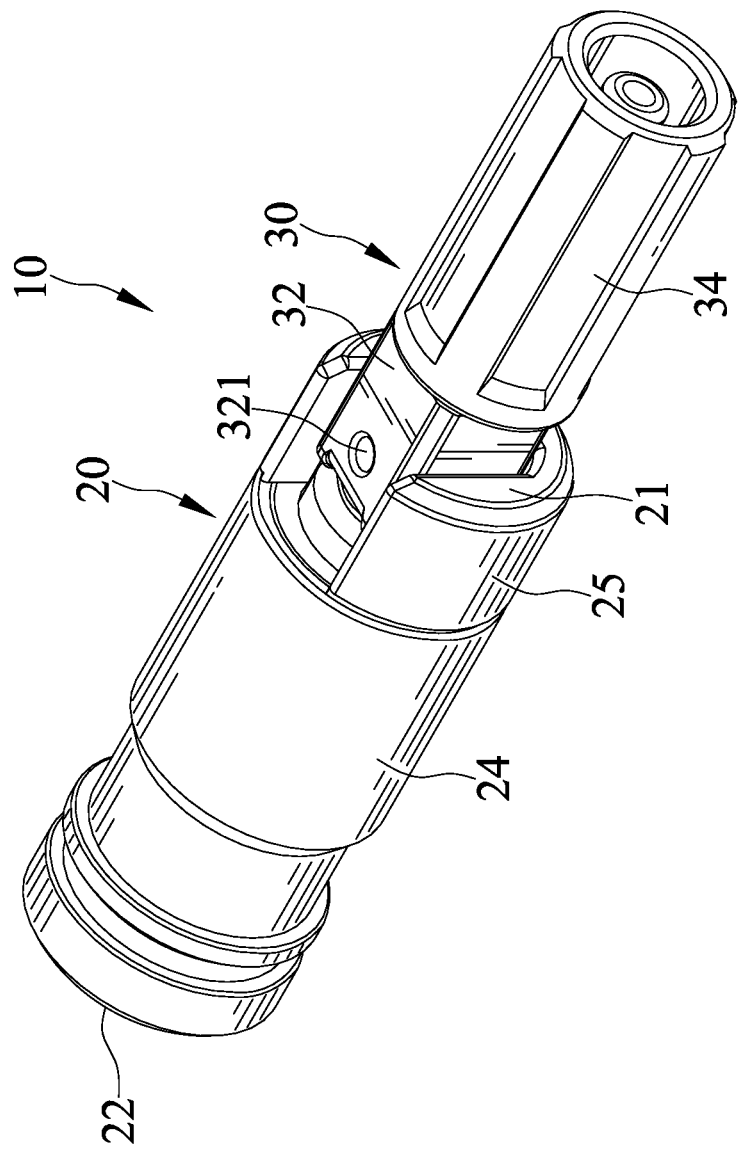
FIG. 1 is a perspective view of a valve connector switchable between locking and releasing of a first embodiment according to the present invention.
Figure 2:
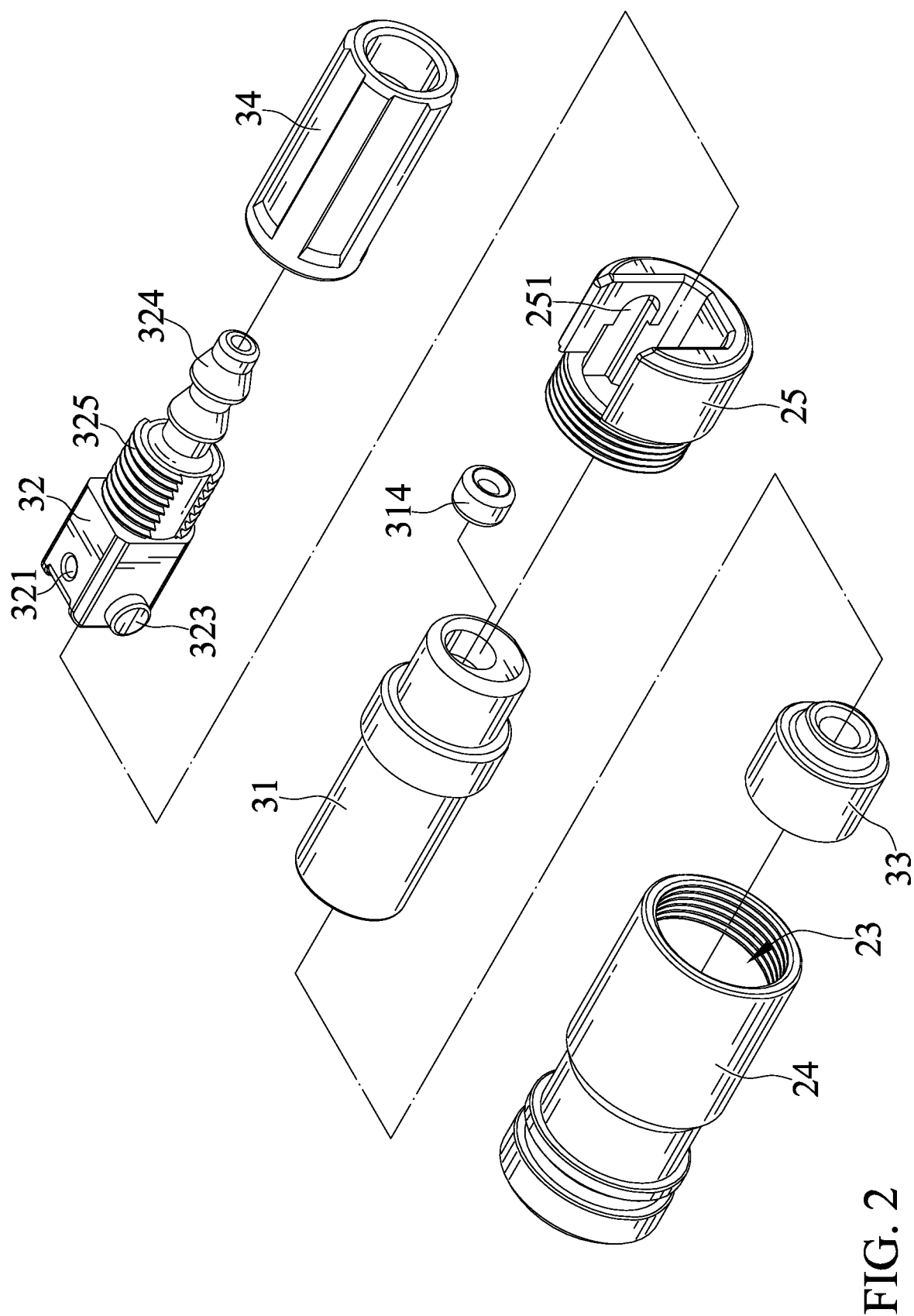
FIG. 2 is an exploded, perspective view of the valve connector of the first embodiment according to the present invention.
Figure 3:
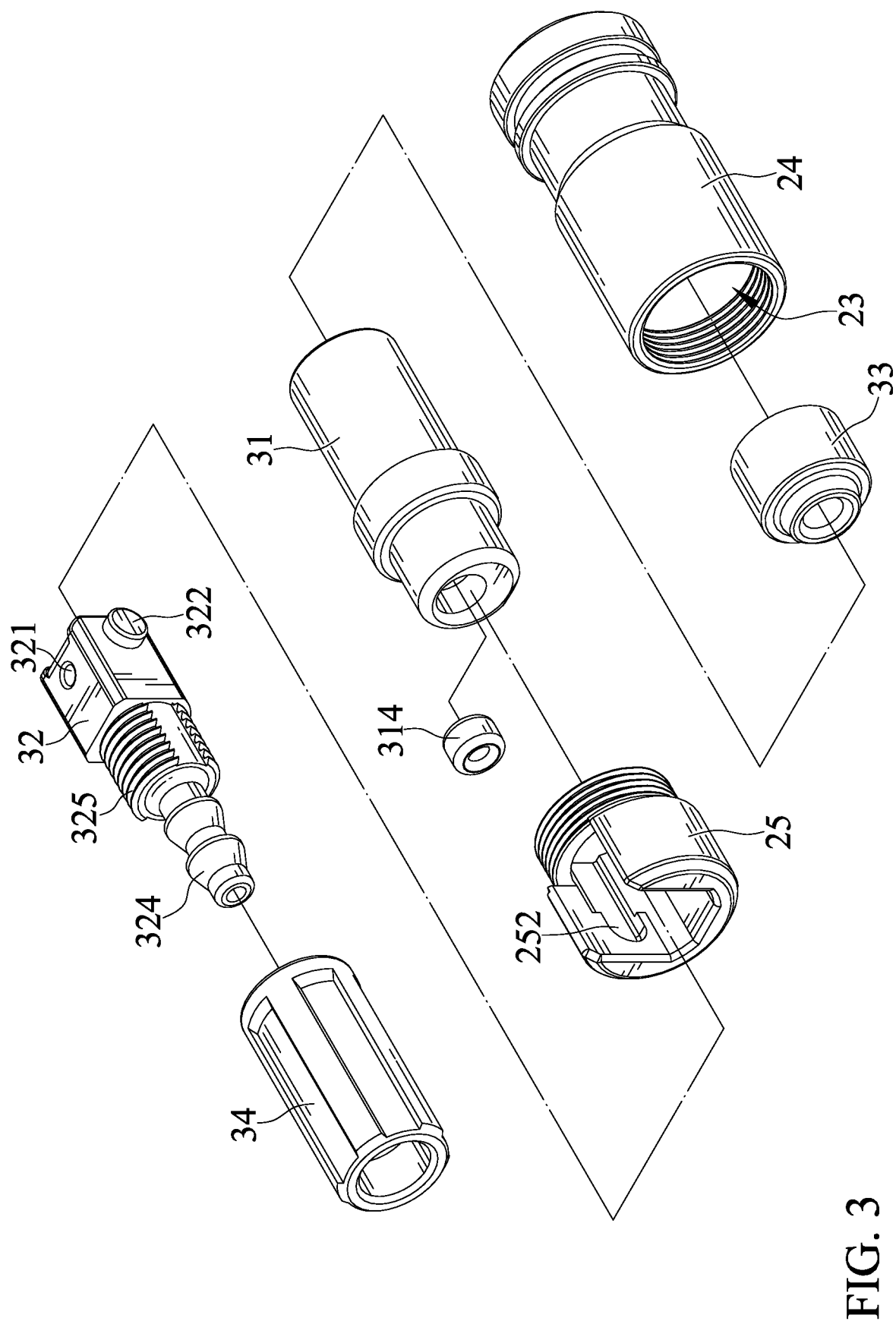
FIG. 3 is another exploded, perspective view of the valve connector of the first embodiment according to the present invention.
Figure 4:
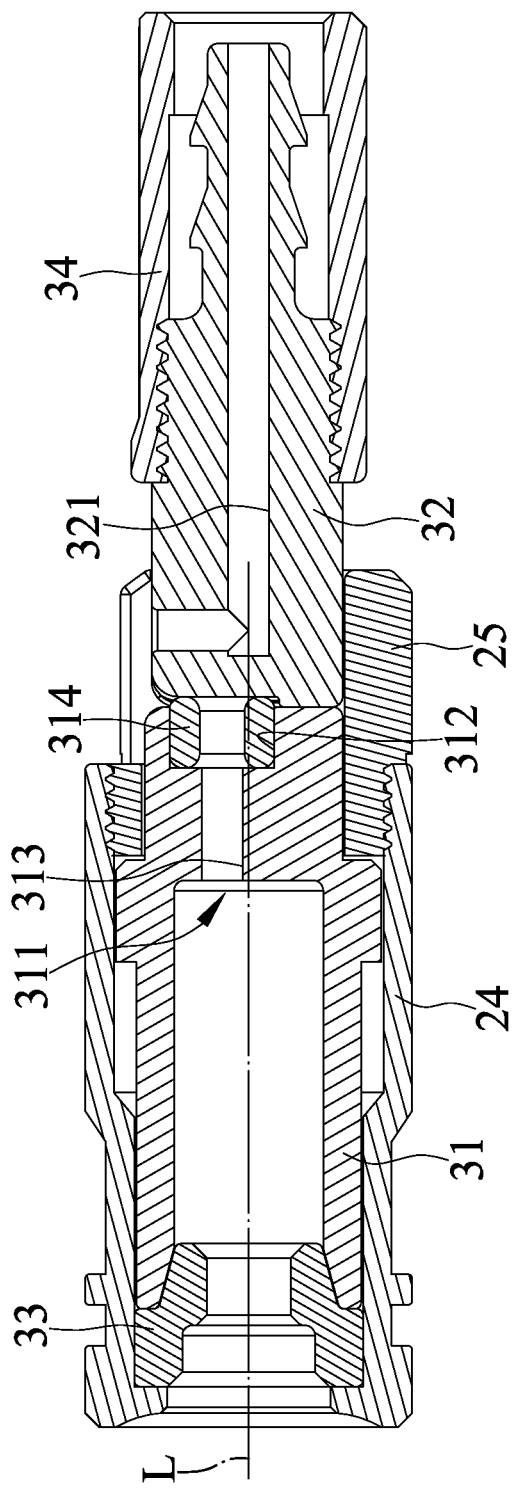
FIG. 4 is a cross sectional view of the valve connector of the first embodiment according to the present invention.
Figure 5:
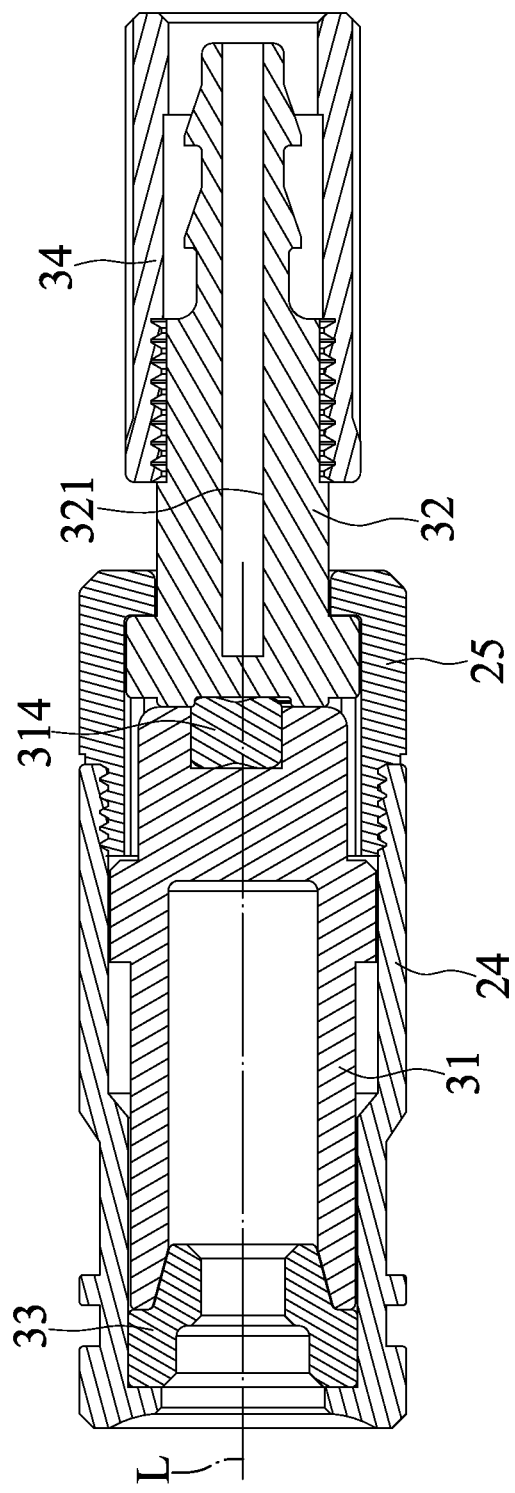
FIG. 5 is another cross sectional view of the valve connector of the first embodiment according to the present invention.

With reference to FIGS. 1-5, a valve connector 10 switchable between locking and releasing of a first embodiment according to the present invention comprises a housing 20 and a pressing device 30. The housing 20 includes an operative end 21 and a coupling end 22 opposite to the operative end 21 along a longitudinal axis L of the housing 20. The housing 20 includes a through-hole 23 extending from the operative end 21 through the coupling end 22 along the longitudinal axis L.

The pressing device 30 includes a push seat 31 and a lever 32. The push seat 31 is received in the through-hole 23 and is located between the lever 32 and the coupling end 22. The push seat 31 includes a first passageway 311 extending therethrough. The lever 32 is pivotably connected to the housing 20 and is pivotable between a release position and a locking position. The lever 32 is adjacent to the operative end 21. The lever 32 abuts against the push seat 31 and is operable to move the push seat 31 along the longitudinal axis L. The lever 32 includes a second passageway 321. When the lever 32 is in the release position, the first passageway 311 does not intercommunicate with the second passageway 321, and the push seat 31 is adjacent to the operative end 21. When the lever 32 moves from the release position to the locking position, the push seat 31 moves towards the coupling end 22, and the first passageway 311 intercommunicates with the second passageway 321 when the lever 32 is in the locking position.

The housing 20 includes a sleeve 24 and a connector 25. The sleeve 24 includes the coupling end 22. The connector 25 is connected to the sleeve 24 and includes the operative end 21. The through-hole 23 extends through the sleeve 24 and the connector 25. The lever 32 is pivotably connected to the connector 25.

An inner periphery of the connector 25 surrounding the through-hole 23 includes a first coupling groove 251 and a second coupling groove 252. Each of the first and second coupling grooves 251, 252 extends from an end of the connector 25 adjacent to the sleeve 24 towards but spaced from the operative end 21. The first coupling groove 251 and the second coupling groove 252 are located on two opposite sides of the through-hole 23, respectively. A first protrusion 322 and a second protrusion 323 are located on two opposite sides of the lever 32, respectively. The first protrusion 322 is received in the first coupling groove 251. The second protrusion 323 is received in the second coupling groove 252. The connector 25 is in threading connection with the sleeve 24.

The pressing device 30 includes an airtight ring 33 disposed in the through-hole 23 and adjacent to the coupling end 22. The airtight ring 33 abuts against an end of the push seat 31 opposite to the lever 32. When the lever 32 is in the locking position, the push seat 31 compresses and deforms the airtight ring 33. When the lever 32 is in the release position, the airtight ring 33 stores its original shape and push the push seat 31 towards the operative end 21.

The first passageway 311 includes a wider section 312 and a narrower section 312. The wider section 312 is in an end of the push seat 31 adjacent to the lever 32. The narrower section 313 is connected to an end of the wider section 312 opposite to the lever 32. An anti-leak ring 314 is disposed in the wider section 312. An end of the anti-leak ring 314 abuts against an end face of the wider section 312 adjacent to the narrower section 313. Another end of the anti-leak ring 314 extends beyond the wider section 312 and abuts against the lever 32. When the lever 32 is in the locking position, the anti-leak ring 314 abuts against an outer periphery of the lever 32.

An end of the lever 32 opposite to the push seat 31 includes a coupling portion 324. The lever 32 includes a locking portion 325 between two ends thereof. The coupling portion 324 has a width smaller than a width of the locking portion 325. The lever 32 is connected to a jacket 34 in threading connection with the locking portion 325. The jacket 34 surrounds but is spaced from the coupling portion 324.

Figure 6:
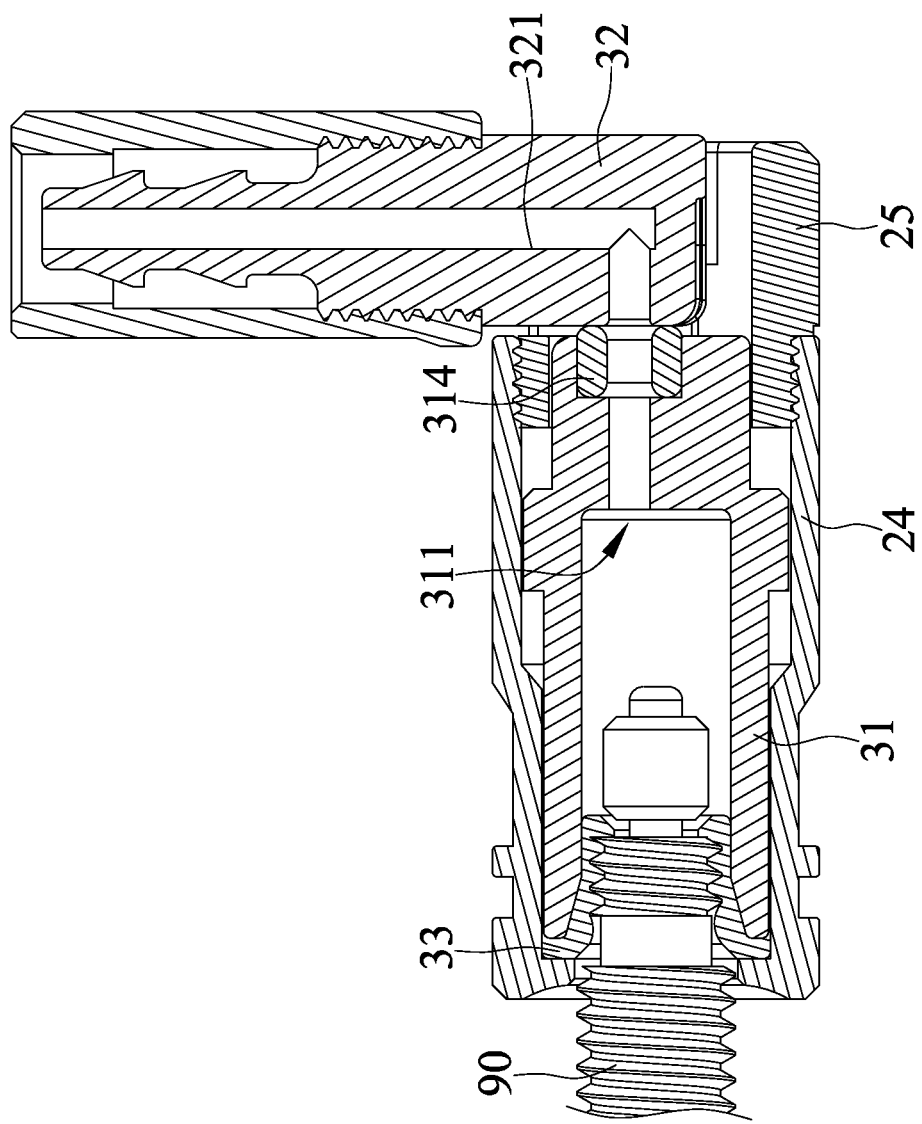
FIG. 6 is a cross sectional view similar to FIG. 4 with a valve coupled with the valve connector and with a lever moved to a locking position.

FIG. 6 shows use of the valve connector 10 switchable between locking and releasing of the first embodiment according to the present invention. The lever 32 of the valve connector 10 can be pivoted to switch between the locking position and the release position to provide flow passages for air while reducing the number of components of the valve connector 10. In use of the valve connector 10, a valve 90 is inserted through the coupling end 22 into the push seat 31. The lever 32 is pivoted to the locking position, and the push seat 31 compresses and deforms the airtight ring 33 and tightly clamps the valve 90 to achieve the airtight effect.

Figure 7:
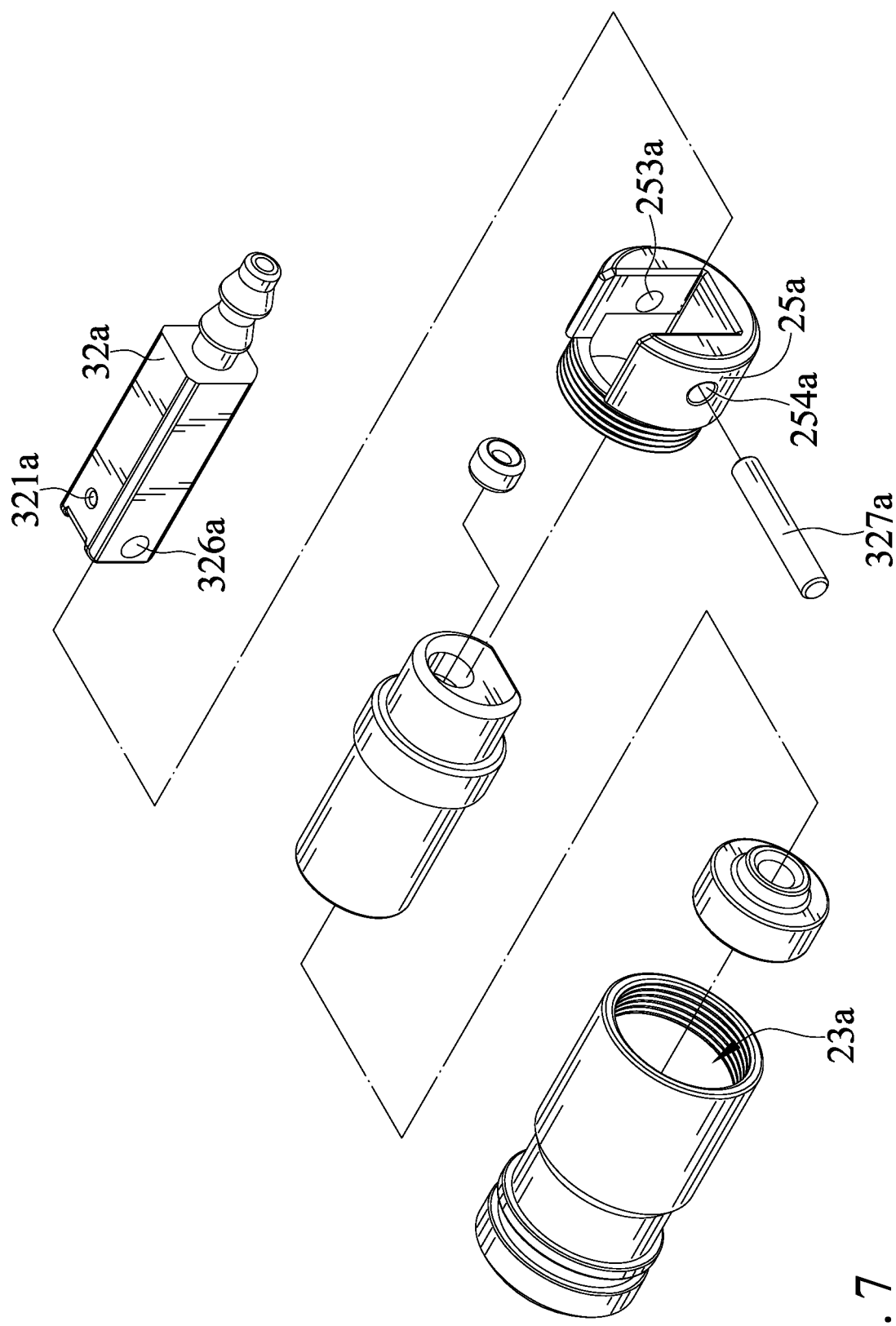
FIG. 7 is an exploded, perspective view of a valve connector switchable between locking and releasing of a second embodiment according to the present invention.
Figure 8:
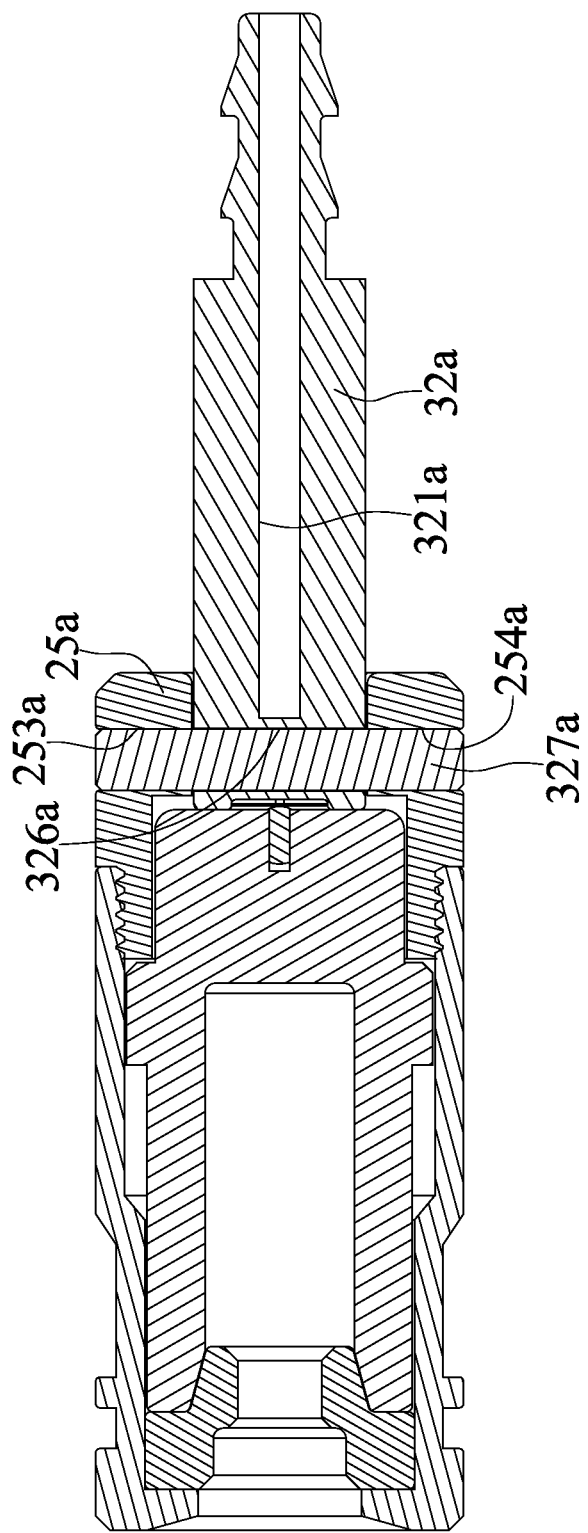
FIG. 8 is a cross sectional view of the valve connector of the second embodiment according to the present invention.

FIGS. 7 and 8 show a valve connector switchable between locking and releasing of a second embodiment according to the present invention. The second embodiment is substantially the same as the first embodiment. The second embodiment is different from the first embodiment in that the inner periphery of the connector 25a surrounding the through-hole 23a includes a first insertion groove 253a and a second insertion groove 254a on two opposite sides of the through-hole 23a, respectively. Each of the first insertion groove 253a and the second insertion groove 254a extends radially from an outer periphery of the connector 25a to the through-hole 23a. Furthermore, the lever 32a includes a third insertion groove 326a extending therethrough in a direction perpendicular to the longitudinal axis L. The third insertion groove 326a does not intercommunicate with the second passageway 321a. A pin 327a extends through the first, second, and third insertion grooves 253a, 254a, 326a. The lever 32a is pivotable between the release position and the locking position about a pivotal axis defined by the pin 327a.

Although specific embodiments have been illustrated and described, numerous modifications and variations are still possible without departing from the scope of the invention. The scope of the invention is limited by the accompanying claims.

The invention claimed is:

1. A valve connector switchable between locking and releasing, comprising:
    a housing including an operative end and a coupling end opposite to the operative end along a longitudinal axis of the housing, and wherein the housing includes a through-hole extending from the operative end through the coupling end along the longitudinal axis; and a pressing device includes a push seat and a lever, wherein the push seat is received in the through-hole and is located between the lever and the coupling end, wherein the push seat includes a first passageway extending therethrough, wherein the lever is pivotably connected to the housing and is pivotable between a release position and a locking position, wherein the lever is adjacent to the operative end, wherein the lever abuts against the push seat and is operable to move the push seat along the longitudinal axis, wherein the lever includes a second passageway, wherein when the lever is in the release position, the first passageway does not intercommunicate with the second passageway, and the push seat is adjacent to the operative end, and wherein when the lever moves from the release position to the locking position, the push seat moves towards the coupling end, and the first passageway intercommunicates with the second passageway when the lever is in the locking position.

2. The valve connector switchable between locking and releasing as claimed in claim 1, wherein the housing includes a sleeve and a connector, wherein the sleeve includes the coupling end, wherein the connector is connected to the sleeve and includes the operative end, wherein the through-hole extends through the sleeve and the connector, and wherein the lever is pivotably connected to the connector.

3. The valve connector switchable between locking and releasing as claimed in claim 2, wherein an inner periphery of the connector surrounding the through-hole includes a first coupling groove and a second coupling groove, wherein each of the first and second coupling grooves extends from an end of the connector adjacent to the sleeve towards but spaced from the operative end, wherein the first coupling groove and the second coupling groove are located on two opposite sides of the through-hole, respectively, wherein a first protrusion and a second protrusion are located on two opposite sides of the lever, respectively, wherein the first protrusion is received in the first coupling groove, and wherein the second protrusion is received in the second coupling groove.

4. The valve connector switchable between locking and releasing as claimed in claim 3, wherein the connector is in threading connection with the sleeve.

5. The valve connector switchable between locking and releasing as claimed in claim 3, wherein the pressing device includes an airtight ring disposed in the through-hole and adjacent to the coupling end, wherein the airtight ring abuts against an end of the push seat opposite to the lever, wherein when the lever is in the locking position, the push seat compresses and deforms the airtight ring, and wherein when the lever is in the release position, the airtight ring restores to its original shape and pushes the push seat towards the operative end.

6. The valve connector switchable between locking and releasing as claimed in claim 3, wherein the first passageway includes a wider section and a narrower section, wherein the wider section is in an end of the push seat adjacent to the lever, wherein the narrower section is connected to an end of the wider section opposite to the lever, wherein an anti-leak ring is disposed in the wider section, wherein an end of the anti-leak ring abuts against an end face of the wider section adjacent to the narrower section, wherein another end of the anti-leak ring extends beyond the wider section and abuts against the lever, and wherein when the lever is in the locking position, the anti-leak ring abuts against an outer periphery of the lever.

7. The valve connector switchable between locking and releasing as claimed in claim 3, wherein an end of the lever opposite to the push seat includes a coupling portion, wherein the lever includes a locking portion between two ends thereof, wherein the coupling portion has a width smaller than a width of the locking portion, wherein the lever is connected to a jacket in threading connection with the locking portion, and wherein the jacket surrounds but is spaced from the coupling portion.

8. The valve connector switchable between locking and releasing as claimed in claim 2, wherein an inner periphery of the connector surrounding the through-hole includes a first insertion groove and a second insertion groove on two opposite sides of the through-hole, respectively, wherein each of the first insertion groove and the second insertion groove extends radially from an outer periphery of the connector to the through-hole, wherein the lever includes a third insertion groove extending therethrough in a direction perpendicular to the longitudinal axis, wherein the third insertion groove does not intercommunicate with the second passageway, wherein a pin extends through the first, second, and third insertion grooves, and wherein the lever is pivotable between the release position and the locking position about a pivotal axis defined by the pin.

9. The valve connector switchable between locking and releasing as claimed in claim 8, wherein the connector is in threading connection with the sleeve.

10. The valve connector switchable between locking and releasing as claimed in claim 8, wherein the pressing device includes an airtight ring disposed in the through-hole and adjacent to the coupling end, wherein the airtight ring abuts against an end of the push seat opposite to the lever, wherein when the lever is in the locking position, the push seat compresses and deforms the airtight ring, and wherein when the lever is in the release position, the airtight ring restores to its original shape and pushes the push seat towards the operative end.

11. The valve connector switchable between locking and releasing as claimed in claim 8, wherein the first passageway includes a wider section and a narrower section, wherein the wider section is in an end of the push seat adjacent to the lever, wherein the narrower section is connected to an end of the wider section opposite to the lever, wherein an anti-leak ring is disposed in the wider section, wherein an end of the anti-leak ring abuts against an end face of the wider section adjacent to the narrower section, wherein another end of the anti-leak ring extends beyond the wider section and abuts against the lever, and wherein when the lever is in the locking position, the anti-leak ring abuts against an outer periphery of the lever.

* * * * *